April 18, 1939.   P. C. TEMPLE   2,154,964
VALVE MECHANISM
Original Filed Aug. 2, 1933   2 Sheets-Sheet 1

Inventor
PAUL C. TEMPLE.
By Albert G. Blodgett
Attorney

April 18, 1939. P. C. TEMPLE 2,154,964
VALVE MECHANISM
Original Filed Aug. 2, 1933   2 Sheets—Sheet 2
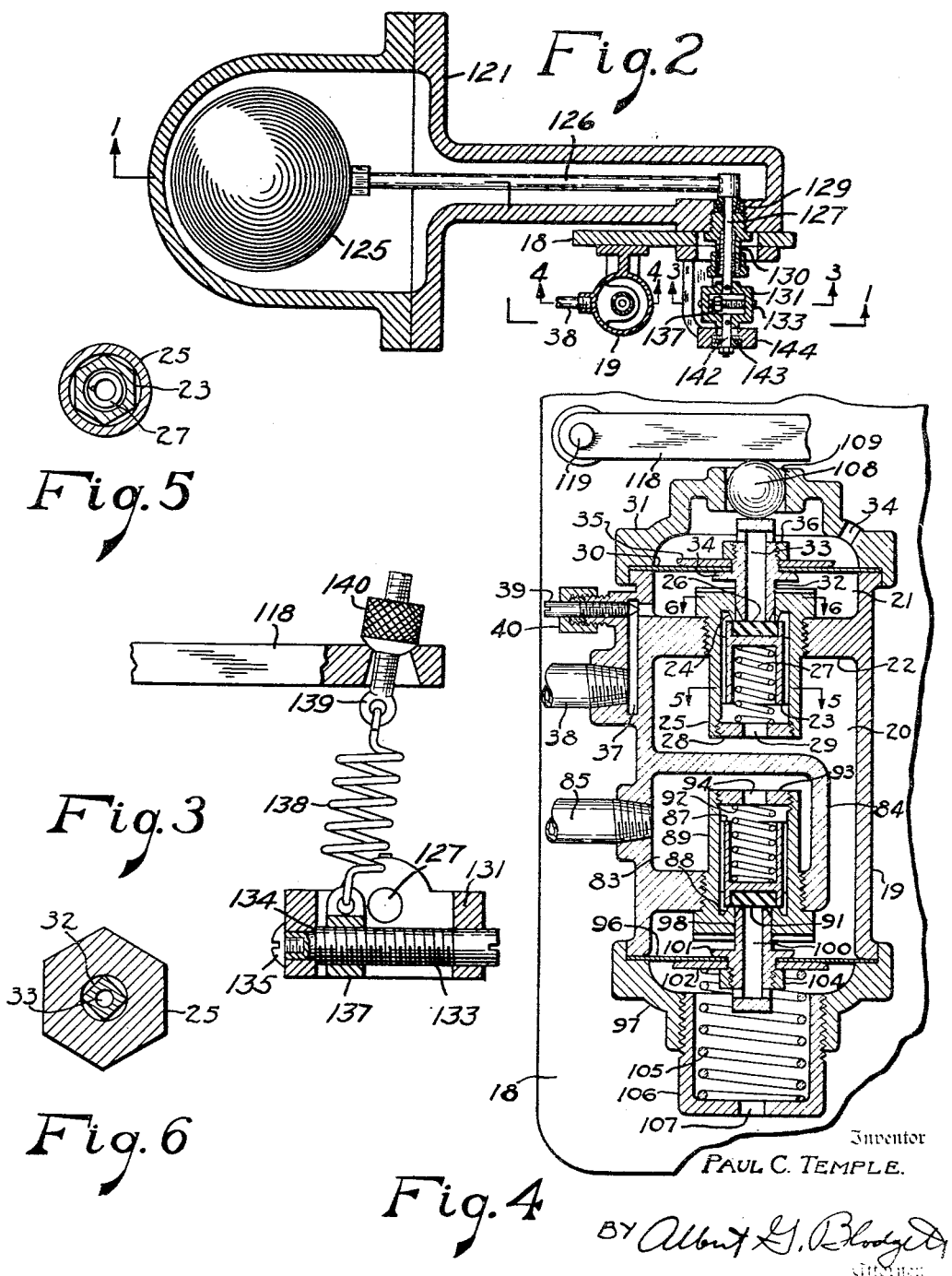
Inventor
PAUL C. TEMPLE.
BY Albert G. Blodgett
Attorney Patented Apr. 18, 1939

2,154,964

UNITED STATES PATENT OFFICE 2,154,964

VALVE MECHANISM

Paul C. Temple, Decatur, Ill., assignor to A. W. Cash Company, Decatur, Ill., a corporation of Delaware Original application August 2, 1933, Serial No. 683,365, now Patent No. 2,078,106, dated April 20, 1937. Divided and this application March 3, 1937, Serial No. 128,716

3 Claims. (Cl. 137—101)

This invention relates to valve mechanisms, and more particularly to valve mechanisms arranged to control the pressure of a fluid in accordance with the position of a float. The fluid being controlled may be used to actuate a controller, such as a valve, which in turn may control the flow of liquid into or out of a tank. This application is a division of my prior application Serial No. 683,365, filed August 2, 1933, now Patent No. 2,078,106, granted April 20, 1937.

It is one object of the invention to provide a valve mechanism of the float-actuated type which will be simple and inexpensive to manufacture, and thoroughly reliable in operation.

It is a further object of the invention to provide a float-actuated valve mechanism which may be readily adjusted to vary its operating range.

It is a further object of the invention to provide a float-actuated valve mechanism having a simple adjustment whereby movement of the float in a particular direction will either increase or decrease the pressure of the controlled fluid, as may be desired.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is an elevation of a valve mechanism in operative relationship with other apparatus, certain parts being shown in section on the line 1—1 of Fig. 2;

Fig. 2 is a section on the line 2—2 of Fig. 1;

Fig. 3 is an enlarged section on the line 3—3 of Fig. 2;

Fig. 4 is an enlarged section on the line 4—4 of Fig. 2;

Fig. 5 is a section on the line 5—5 of Fig. 4; and

Fig. 6 is a section on the line 6—6 of Fig. 4.

Figure 1:
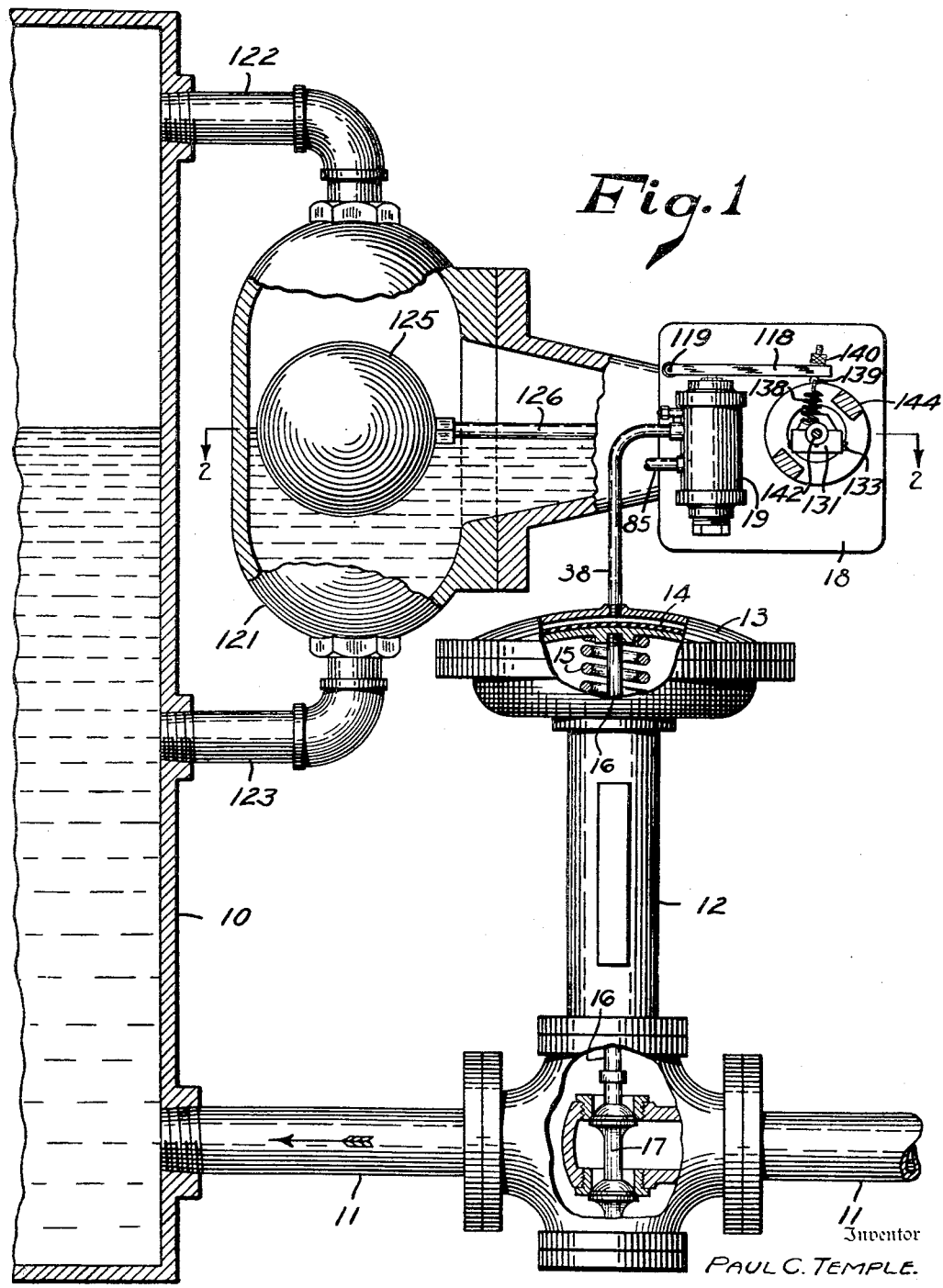

In Fig. 1 there is shown a tank 10 which is supplied with liquid through a pipe 11, the rate of flow in the pipe being controlled by means of a motor valve 12. This motor valve is provided with a diaphragm chamber 13 containing a diaphragm 14, the latter being loaded by means of a coiled compression spring 15 and connected by means of a rod 16 to a balanced valve member 17. With this construction, an increased pressure in the chamber 13 will force the diaphragm 14 and valve member 17 downwardly, thus opening the valve and allowing an increased flow in the pipe 11.

In one construction which I have found satisfactory, a change of 13 pounds in pressure per square inch is necessary to give full travel to the motor valve, the valve being wide open at 15 pounds and fully closed at 2 pounds. Of course intermediate pressures will result in corresponding intermediate positions for the valve member 17.

In order to control the pressure in the diaphragm chamber 13, I provide a novel form of valve mechanism comprising a supporting frame shown as a plate 18 on which is mounted a hollow casing 19 shaped to provide an inlet chamber 20 and an outlet chamber 21 separated by a partition 22. The inlet chamber 20 is supplied with fluid under pressure by a means which will be more fully described hereinafter, and the flow from the inlet chamber into the outlet chamber 21 is controlled by a valve member or piston 23 which cooperates with an annular valve seat 24. The seat 24 is formed in a valve cage 25 which is screw-threaded into the partition 22. The valve piston is slidably supported in the cage and is preferably provided with a disk 26 at its upper end which in closed position contacts with the valve seat. The outside of the valve piston is hexagonal, as shown in Fig. 5, to allow a space for the flow of fluid between the valve piston and the cage. While the fluid pressure serves to bias the valve toward closed position, I prefer to supplement this action by means of a small coiled compression spring 27 mounted in the hollow interior of the valve piston and resting at its lower end on a plug 28 screw-threaded to the valve cage 25. The plug 28 is formed with an opening 29 therethrough to allow fluid to enter the valve cage from the chamber 20.

In order to control the fluid pressure in the chamber 21, I provide a flexible diaphragm 30 which forms one wall of the chamber. This diaphragm is clamped at its periphery between the casing 19 and a cap 31. The diaphragm 30 is located in a plane perpendicular to the direction of movement of the valve member 23, and these parts are connected by means of a pusher post 32 mounted on the diaphragm and extending downwardly through the upper portion of the valve cage 25 and into contact with the disk 26. The valve cage forms a guideway for the pusher post, and the outside of the post is square, as shown in Fig. 6, to allow flow of fluid between these parts. A central longitudinal passage 33 is provided through the pusher post, and the lower end of the pusher post is beveled to provide a comparatively sharp annular surface for contact with the disk 26. These various parts are so arranged that if the diaphragm moves upwardly and carries the lower end of the pusher post out of contact with the valve disk 26, the fluid may escape through the passage 33 into the space above the diaphragm and thence to atmosphere through a vent 34 in the cap 31. The pusher post 32 thus forms a relief or exhaust valve as well as an operating means for the inlet valve 23. The pusher post is shown provided with a flange 34' which contacts with the lower surface of the diaphragm. An annular pressure plate 35 contacts with the upper surface of the diaphragm, and these parts are all held in the proper relationship by means of a nut 36 screw-threaded to the pusher post above the pressure plate.

The chamber 21 is connected by means of a passage 37 and a pipe 38 with the diaphragm chamber 13 of the motor valve 12, so that variations in the fluid pressure in chamber 21 will cause the valve member 17 to change its position. In order to control the speed of movement of the motor valve, I have shown an adjustable needle valve 39 mounted in the passage 37 and extending outwardly through a stuffing box 40.

If the pressure in the chamber 20 should be very high, and the apparatus should for any reason get beyond its operating range, there would be danger of applying an excessive pressure to the diaphragm of the motor valve. In order to avoid this possibility and at the same time obtain better regulating action, I preferably provide means for maintaining a substantially constant pressure in the chamber 20. This pressure should be only slightly higher than the 15 pounds necessary to produce full opening of the motor valve. In order to obtain this pressure regulation and still retain a simple compact construction, the casing 19 is shaped to provide a chamber 83 which is separated from the chamber 20 by a partition 84. The chamber 83 is supplied with compressed air or other fluid under pressure from a suitable source through a pipe 85, and this fluid flows into the chamber 20 under the control of a valve member or piston 87 which cooperates with an annular valve seat 88. The seat 88 is formed in a valve cage 89 which is screw-threaded into the partition 84. The valve piston is slidably supported in the cage and is preferably provided with a disk 91 at its lower end which in closed position contacts with the valve seat. The outside of the valve piston is hexagonal, the same as valve piston 23, to allow a space for the flow of fluid. A small coiled compression spring 92 is mounted in the hollow interior of the valve piston with its upper end supported by a plug 93 screw-threaded to the valve cage 89. The plug 93 is formed with an opening 94 therethrough to allow fluid to enter the valve cage from the chamber 83.

In order to control the pressure in the chamber 20, I provide a flexible diaphragm 96 which forms one wall of the chamber. This diaphragm is clamped at its periphery between the casing 19 and a cap 97. The diaphragm 96 is located in a plane perpendicular to the direction of movement of the valve 87, and these parts are connected by means of a pusher post 98 mounted on the diaphragm and extending upwardly through the lower portion of the valve cage 89 and into contact with the disk 91. This pusher post is similar to the pusher post 32, and is provided with a square outside and a central longitudinal passage 100. The upper end of the pusher post is beveled to provide a comparatively sharp annular surface for contact with the disk 91, and a flange 101 is provided on the pusher post to contact with the upper surface of the diaphragm 96. An annular pressure plate 102 contacts with the lower surface of the diaphragm, and the parts are held together by means of a nut 104 screw-threaded to the pusher post below the pressure plate. The diaphragm is supported against the fluid pressure by means of a coiled compression spring 105 extending between the pressure plate 102 and a hollow plug 106 screw-threaded to the cap 97 and provided with a vent 107. It will be noted that in relation to the valve 87, the chamber 83 is an inlet chamber, and the chamber 20 is an outlet chamber. Furthermore, in relation to the mechanism as a whole, the chamber 20 is an intermediate chamber.

The diaphragm 30 is subjected to a controlled loading, so that the pressure transmitted through the pipe 38 to the motor valve may be regulated. For this purpose there is shown a sphere 108 mounted in a cylindrical opening 109 in the cap 31 and contacting with the top of the pusher post 32. A horizontal lever 118 is mounted above and in contact with the sphere 108, the lever being pivotally connected at one end to the plate 18 by means of a pin 119.

In order to control the level of the liquid in the tank 10, I provide means whereby variations in the liquid level will cause variations in the loading of the lever 118. This is preferably accomplished by utilizing a float which rises and falls with the liquid level, the float being connected to the lever by means including a spring. In the construction illustrated, which is suitable for controlling the level in a tank under pressure, I have provided a hollow float chamber 121 which is attached to the plate 18 and which is connected to the tank 10 by means of pipes 122 and 123 located respectively above and below the normal liquid level. A float 125, which may be a hollow metal sphere, is mounted on one end of a horizontal arm 126 within the float chamber 121. It will be understood that this float may be solid, and it may be counterweighted if necessary to provide buoyancy. The term "float" in the specification and claims is not to be limited to a body which is lighter than an equal volume of the liquid. The arm 126 is connected to a horizontal shaft 127 arranged at right angles thereto and mounted in a ball bearing 129 (Fig. 2). The shaft 127 extends outwardly from the float chamber 121 through a stuffing box 130, and carries on its outer end a bracket 131 in which is rotatably mounted a screw 133 extending parallel to the arm 126. Axial movement of the screw 133 is prevented by a shoulder 134 thereon and by a small screw 135 in the adjacent end thereof, as shown particularly in Fig. 3. The screw 133 carries a nut 137 which is connected to the free end of the lever 118 by means of a coiled tension spring 138, and eye-bolt 139, and a nut 140. The nut 140 is knurled, and it is provided with a spherical lower surface which contacts with a spherical socket in the lever to form a swivel joint. It will be noted that the screw 133 can be rotated to vary the position of the nut 137 relative to the axis of the shaft 127, thus varying the mechanical advantage of the connection between the float 125 and the valve mechanism in the casing 19. The screw 133 and nut 137 form a lever having an adjustable effective length. It will also be noted that the parts are so constructed that the nut 137 can be located at either side of the axis of the shaft 127, for a purpose which will be explained hereinafter.

In order to support the bracket 131 and shaft 127 more firmly, I preferably secure to the outer end of the bracket a short shaft 142 arranged in axial alignment with the shaft 127. This shaft 142 is supported in a ball bearing 143 mounted in a frame 144 secured to the plate 18.

The operation of the invention will now be apparent from the above disclosure. Compressed air or other fluid under pressure enters the chamber 83 through the pipe 85 and flows past the valve 87 into the chamber 20, where its pressure is effective on the diaphragm 96 which is balanced by the spring 105. The pusher post 98, actuated by the diaphragm and spring, holds the valve 87 open sufficiently to maintain the desired pressure in the chamber 20 irrespective of the initial pressure of the fluid or the rate at which it is withdrawn from the chamber 20. If no fluid is being withdrawn, the disk 91 will contact with the annular seat 88 and stop all flow. In case leakage should occur past the disk 91, tending to increase the pressure in chamber 20 beyond its proper value, the diaphragm will move the pusher post downwardly and out of contact with the disk, thereby allowing fluid to exhaust from the chamber 20 through the passage 100 and vent 107. The pusher post under these circumstances acts as a pressure relief valve.

From the chamber 20 the fluid flows under the control of the valve 23 into the chamber 21, when its pressure is effective on the diaphragm 30 which is balanced by the force transmitted through the lever system. The pressure in the chamber 21 is also effective on the diaphragm 14 of the motor valve 12, the diaphragm chamber 13 of the motor valve being connected to the chamber 21 by means of the pipe 38 and passage 37. Consequently, the amount of compression of the spring 15 and the position of the valve member 17 are determined by the fluid pressure in the chamber 21.

The liquid level in the float chamber 121 will of course be the same as that in the tank 10, and any variation in this level will cause the float 125 to move up or down. This will vary the tension of the spring 138 and the load applied to the lever 118, thus varying the fluid pressure transmitted through the pipe 38 to the motor valve 12. As a result, the motor valve will move and either increase or decrease the flow in the pipe 11, as may be necessary to restore the desired liquid level in the tank.

With the construction illustrated, the spring 138 can be comparatively light, and its tension need vary only slightly throughout the operating range. This makes it possible to use a small float and still obtain accurate control, with the degree of immersion of the float remaining substantially constant at all positions. Furthermore, the light spring results in light bearing loads, with practically no friction, and very sensitive operation. By turning the screw 133 it is possible to vary the horizontal distance between the nut 137 and the axis of the shaft 127, thus changing the operating range, that is, the distance the float 125 must move in order to move the motor valve from the fully closed to the fully open position or vice versa. By adjusting the nut 137 to the right hand side of the shaft 127 in Fig. 3, the operation will be reversed, and a rising liquid level will cause the fluid pressure transmitted to the motor valve to increase instead of decrease. This is necessary in case the motor valve is arranged to control the liquid level by controlling the discharge of liquid from the tank, or in case the motor valve is of a type which closes with an increasing control pressure. By adjusting the nut 140 it is possible to vary the liquid level which will be maintained. A slight adjustment of this nut will be necessary when the operating range is adjusted, if the normal liquid level is to remain the same, for it will be apparent from Fig. 3 that a variation in the position of the nut 137 will cause a slight change in the tension of the spring 138. The initial tension can be restored by a slight adjustment of the nut 140. It will be apparent from Fig. 1 that the vertical movement of the float 125 is limited by the walls of the float chamber, even though the liquid level should for some reason get beyond the operating range. The spring 138 prevents any excessive force from being applied to the lever 118. The construction is simple and inexpensive, and if properly installed and adjusted it will maintain the desired liquid level with great accuracy and without hunting.

Having thus described my invention, what I claim as new and desire to secure by Letters Patent is:

1. A valve mechanism comprising a casing shaped to provide a chamber for fluid under pressure, means including a device responsive to the pressure in the chamber and operative to maintain said pressure at a predetermined value dependent upon the loading of said device, a horizontal rotatable shaft, a transverse arm connected to the shaft, a float mounted on the arm, a bracket attached to the shaft, a member mounted on the bracket and adjustable in relation to the axis of the shaft, a lever connected with said device to load the same, and a coiled tension spring connecting the member with the lever, whereby the fluid pressure maintained in the chamber will be dependent upon the position of the float.

2. A valve mechanism comprising a casing shaped to provide a chamber for fluid under pressure, means including a device responsive to the pressure in the chamber and operative to maintain said pressure at a predetermined value dependent upon the loading of said device, a horizontal rotatable shaft, a transverse arm connected to the shaft, a float mounted on the arm, a bracket attached to the shaft, a member mounted on the bracket and adjustable to either side of the axis of the shaft, a lever connected with said device to load the same, and means connecting the member with the lever, whereby the fluid pressure maintained in the chamber will be dependent upon the position of the float.

3. A valve mechanism comprising a casing shaped to provide a chamber for fluid under pressure, means including a device responsive to the pressure in the chamber and operative to maintain said pressure at a predetermined value dependent upon the loading of said device, a horizontal rotatable shaft, a transverse arm connected to the shaft, a float mounted on the arm, a bracket attached to the shaft, a member mounted on the bracket and adjustable to either side of the axis of the shaft, a lever connected with said device to load the same, and a coiled tension spring connecting the member with the lever, whereby the fluid pressure maintained in the chamber will be dependent upon the position of the float.

PAUL C. TEMPLE.